(No Model.) 2 Sheets—Sheet 2.
C. B. FAIRCHILD.
VEHICLE PROPELLING MACHINE.
No. 595,156. Patented Dec. 7, 1897.
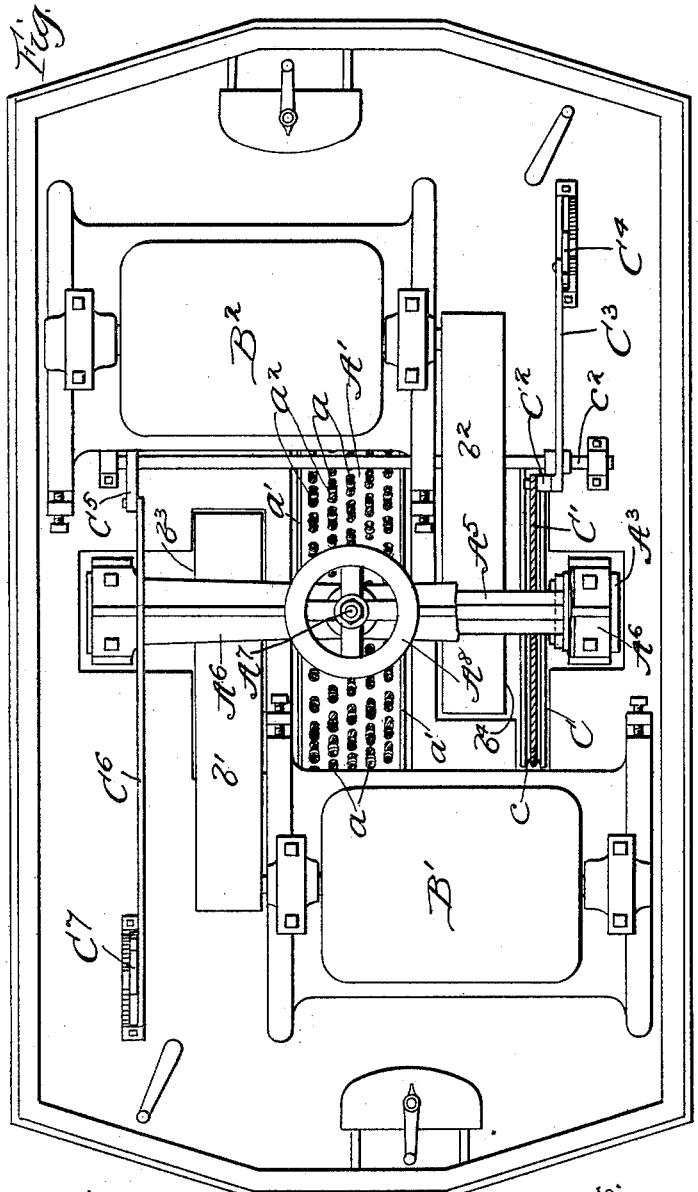
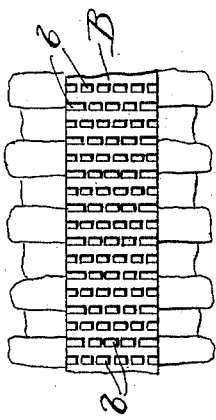
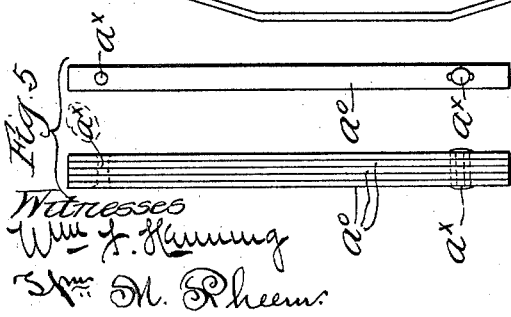
Inventor
Charles B. Fairchild
By Geo. W. Waldo
Atty.
Witnesses

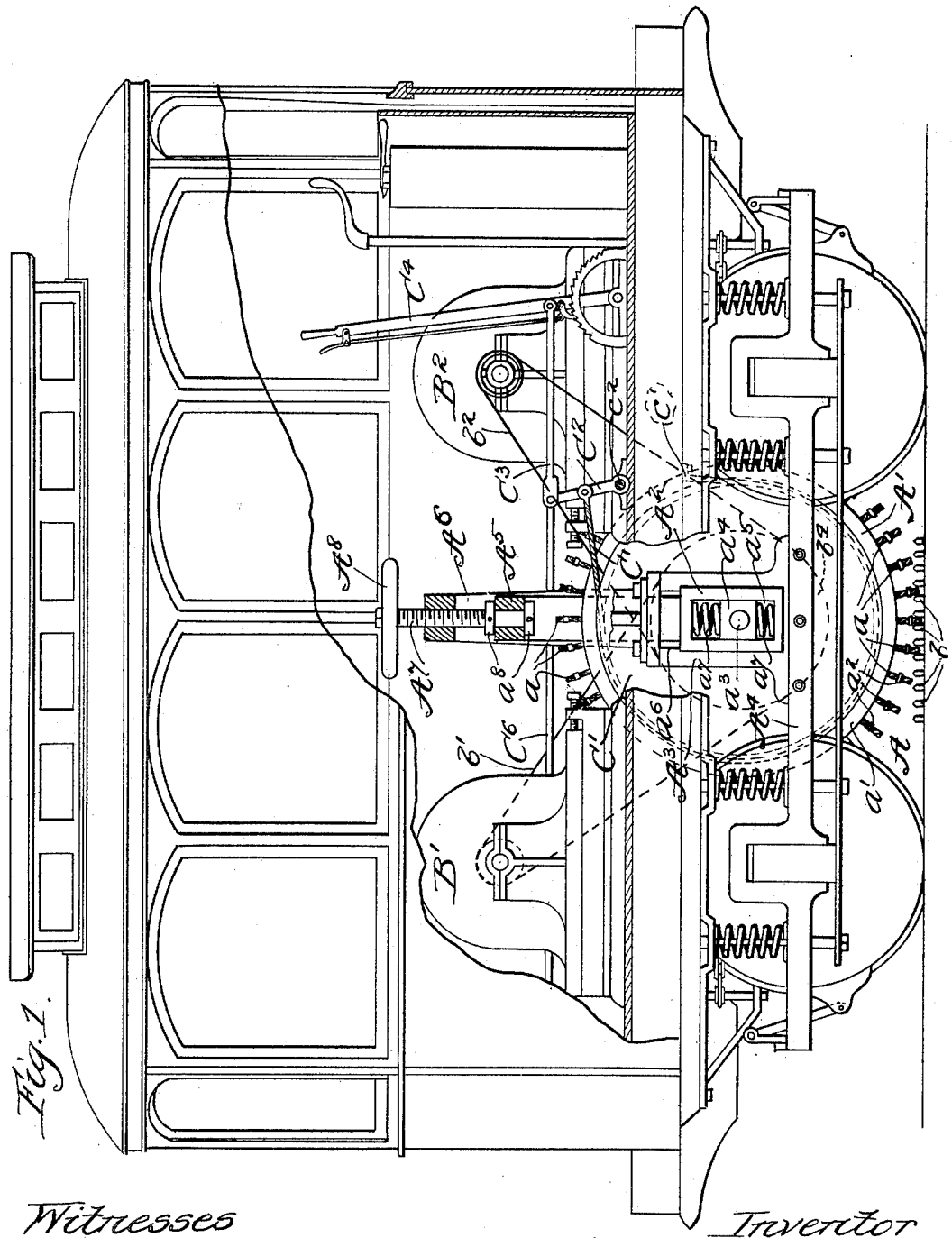

UNITED STATES PATENT OFFICE.

CHARLES B. FAIRCHILD, OF NEW YORK, N. Y.

VEHICLE-PROPELLING MACHINE.

SPECIFICATION forming part of Letters Patent No. 595,156, dated December 7, 1897.

Application filed February 18, 1896. Serial No. 579,720. (No model.)

*To all whom it may concern:*

Be it known that I, CHARLES B. FAIRCHILD, a citizen of the United States, and a resident of New York, in the county of New York and State of New York, have invented a certain new and useful Vehicle-Propelling Mechanism, of which the following is a specification.

This invention relates to improvements in motor-propelled vehicles, and has for a primary object to provide improved means for applying the power generated by the motor to the propulsion of the vehicle.

In the preferable form thereof now known to me a propelling mechanism embodying my invention comprises a traction-wheel consisting of a solid cylindrical hub or body, in the periphery of which are secured a plurality of resilient teeth, which project therefrom radially, said wheel being rigidly secured to a shaft supported so as to rotate freely in suitable bearings formed on the vehicle, a corrugated surface formed in the road-bed, with which the free ends of the teeth of the traction-wheel engage, driving connection between the shaft of the traction-wheel and a motor or motors carried on the vehicle, and a suitable brake applied to the shaft of the traction-wheel.

The invention also consists in the various other features, combinations of features, and details of construction hereinafter described, and then pointed out in the claims.

In the accompanying drawings a propelling mechanism embodying my invention is fully illustrated.

Figure 1 is a side elevation of a motor-car equipped with my improved propelling mechanism, parts of the car being broken away to expose said propelling mechanism. Fig. 2 is a top plan view of the car-floor and propelling mechanism. Fig. 3 is a transverse sectional view of the road-bed and traction rail or plate. Fig. 4 is a top plan view thereof, and Figs. 5 and 6 show modified forms of traction-wheel teeth.

In the drawings I have shown my improved propelling mechanism as applied to the motor-car of an electric street-railway.

Referring now to the drawings, A designates as a whole a traction-wheel which consists of a rigid hub or body A', in the periphery of which are secured a plurality of resilient teeth $a$, which project radially therefrom. The hub A' is preferably made of hard-wood plank rigidly secured together in layers in such manner that the grain of adjacent layers will run in different directions, to the lateral faces of which are rigidly secured iron plates or washers $a'$.

In the drawings I have shown three different forms of brush-teeth, which I will now describe.

What I now consider the preferable form of brush-tooth is that shown in the general views of the mechanism. This form of tooth is made from a strand of wire cable cut to the right length and tempered a mild spring-temper. To prevent fraying or untwisting of teeth of this kind, collars or ferrules $a^2$ are secured adjacent to the free ends thereof, as clearly shown. Brush-teeth of this kind are substantially circular in cross-section and about seven-sixteenths of an inch in diameter. Teeth of this kind are slightly compressible endwise, which gives a yielding contact of the traction-wheel A with the corrugations in the road-bed, hereinafter described, and also embody the characteristics of being capable of deflection or spring in any lateral direction, which feature is a desideratum when considering the unevenness of roadways, the traversing of curves, and sidewise swaying of traction-vehicles when in rapid motion.

A second form of tooth (illustrated in Fig. 5 of the drawings) consists of a plurality of strips or leaves $a^0$, of sheet-steel, drawn to a spring-temper and secured together by a rivet or rivets $a^x$, so as to form a laminated structure. Preferably the leaves $a^0$ will be secured together only at the end that is inserted into the hub or body A', leaving the outer ends thereof disconnected from each other. If for any reason deemed desirable, however, my invention contemplates securing said leaves $a^0$ together at both ends; but in this case the rivet $a^x$ which secures the outer free ends thereof together is inserted through registering slots formed therein. In this manner the ends of said leaves will always remain even under flexure, as they would were they disconnected. Teeth of this kind will be square or rectangular in cross-section and a desirable size therefor is about three-fourths of an inch to one inch square. This laminated form of tooth also embodies the characteristic of being slightly compressible lengthwise, or, in other words, the ends thereof are capable of advancing toward and receding from each other in a direct line when subjected to endwise pressure, owing to the great resiliency of the laminæ.

The third form of tooth (shown in Fig. 6 of the drawings) consists of a solid steel rod or wire, which is likewise drawn to a spring-temper, in which is formed a coil or loop $a^y$, whereby the flexibility of teeth of this type is very greatly increased. When teeth of this form are used, they are secured in the hub or body A' in such position that the loops $a^y$ will extend in the direction in which said teeth will be flexed. Teeth of this form are preferably circular in cross-section and about one-half an inch in diameter and also possess the characteristic of shortening between ends when subjected to endwise pressure.

The teeth $a$ are secured in the periphery of the hub A' in rows, so as to be distributed over the same in a uniform manner. In the preferable construction shown also said teeth $a$ are secured in said hub in spiral rows, teeth at opposite ends of adjacent rows being on a line extending transversely across the face of the hub A', parallel with the axis of said wheel.

The teeth $a$ are about six inches long and are secured in the hub A' so as to project therefrom about four and one-half inches. Adjacent teeth in the same row are separated by a space of about one-half of an inch, and the distance between adjacent rows of teeth is such that the space between the free ends of the teeth thereof will be about two inches, or, in other words, the pitch of the rows at the ends of the teeth is about two inches.

The total diameter of the traction-wheel A to the free ends of the teeth $a$ is preferably from thirty (30) to forty-two (42) inches, making the diameter of the hub A' from twenty-one (21) to thirty-three (33) inches. The size of the traction-wheel, however, admits of variation to meet any special requirements.

The wheel A, constructed as described, is rigidly secured to a horizontal shaft $a^3$, mounted so as to rotate freely in suitable bearings supported on the car. In the preferable construction shown the ends of the shaft $a^3$ are supported in journal-blocks $a^4$, movable toward and from the road-bed in slots or ways $a^5$, formed in blocks $A^2$, which are in turn fitted to and movable toward and from the road-bed in suitable guide slots or ways $a^6$, formed in standards $A^3$, secured to or formed integral with the side bars $A^4$ of the truck-frame of the car. Coiled springs $a^7$ are inserted above and below the journal-blocks $a^4$ between said journal-blocks and the ends of the slot $a^5$.

The slotted blocks $A^2$ are rigidly secured to the opposite ends of a rigid beam $A^5$. Secured to the standards $A^3$, directly over the beam $A^5$, is a second rigid beam $A^6$. Threaded through the beam $A^6$ is an upright screw-shaft $A^7$, the lower end of which is secured against longitudinal movement in a suitable bearing formed in the beam $A^5$ in such manner as to rotate freely therein. As shown, the lower end of the bar or shaft $A^7$ is round and is received in a suitable bearing formed in the beam $A^5$, in which it is secured by collars $a^8$, rigidly secured to said shaft above and below said beam. The screw $A^7$ is manipulated by means of a hand-wheel $A^8$, secured to the upper end thereof. It is obvious that said screw $A^7$ affords convenient means to regulate the force of the contact between the traction-wheel and the road-bed, and also that by means of said screw the said traction-wheel may be raised out of engagement with the road-bed when desired—as, for example, when the car is descending a grade, down which it will descend or coast of its own weight without expenditure of power by the propelling-motors. It is also obvious that the springs $a^7$ will maintain said traction-wheel yieldingly in contact with the road-bed and will permit it to accommodate itself to irregularities therein, all in a desired manner.

A convenient method of securing the traction-wheel A to the shaft $a^3$ is by keying the plates or washers $a'$ thereto.

Secured in the road-bed in position to be engaged by the teeth $a$ is a bar B, on the exposed surface of which are formed projections or corrugations $b$, which will be engaged by the traction-teeth $a$. In the preferable construction shown the projections $b$ consist of straight-sided teeth, the ends of which are beveled on opposite sides to a blunt point. The depth of the teeth $b$ is about one-half of an inch and what may be termed the "pitch" thereof about one (1) inch, the thickness of the teeth $b$ and the width of the intervening spaces being desirably the same.

Where wooden pavement or the like is used, the frictional engagement of the traction-teeth $a$ therewith will be sufficient to propel the car, and the corrugated bar B may then be dispensed with. Speaking generally, however, my invention contemplates the use of said bar B.

Rotation is imparted to the shaft $a^3$ from motors B' $B^2$ by means of suitable driving connection between said motors and shaft. As shown, it is driven by belts $b'$ $b^2$, which are adjusted to the driving-pulley of the motors and to pulleys $b^3$ $b^4$, secured to said shaft $a^3$.

Any suitable form of motor may be used to drive said traction-wheel A, those indicated in the drawings being a usual form of street-railway motor. Preferably also the motors B' $B^2$ will be yieldingly supported relatively to the parts of the car unyieldingly supported upon the rails. In this manner the pounding of the wheels at the rail-joints and the attendant injurious results due to securing the motors rigidly to the car-axle in the manner heretofore common are avoided. As shown, the motors B' B² are supported upon the floor of the car and the springs of the car form the desired cushion.

It is obvious that by stopping the rotation of the traction-wheel A said wheel will operate as a brake to stop the car. Means to stop said traction-wheel are provided as follows: Secured to the shaft $a^3$ is a disk C, in the periphery of which is formed a groove $c$, to which is adjusted a wire rope or cable C', one end of which is anchored at $c'$ to the car-body or to a rigid portion of the truck-frame and the other end of which is secured to a lever-arm C², the lower end of which is rigidly secured upon a transverse shaft $c^2$ and the upper end of which is connected by a brake-rod C³ with a brake-lever C⁴, located at the end of the car in position to be accessible to the motorman. Rigidly secured to the shaft $c^2$ at the opposite side of the car from the lever-arm C² is secured lever-arm C⁵, the free end of which is connected by a brake-rod C⁶ with a brake-lever C⁷, located at the opposite end and on the opposite side of the car from the brake-lever C⁴, thus making provision for applying the brake from either end of the car. The diameter of the brake-disk C is slightly less than that of the traction-wheel A, said brake-disk being preferably made as large as practicable without danger of its coming into contact with the road-bed. The groove $c$ is preferably V-shaped, as thereby a wedging action is secured when a strain is brought upon the brake-cable C', which will greatly augment the frictional resistance which said cable offers to the rotation of said disk.

Owing to the rotation of the disk C, as soon as the wire rope or cable C' is brought into frictional engagement with said disk the movement of the periphery of said disk will cause the bight of the cable to tighten around it automatically with desired force. Very little effort on the part of the operator is therefore necessary to apply said brake.

While I have herein shown my improved propelling mechanism as actuated by electric motors, it is obvious that any other approved form of motor, as a gas or a steam motor or the like, may be substituted therefor without departing from the spirit of my invention.

A great advantage of my improved propelling device is that cars equipped with it are practically in positive engagement with the road-bed, from which fact it results that they are under much better control than are cars driven through the medium of the supporting-wheels, that they may be started and stopped much more quickly, that they are not affected by a slippery condition of the rails due to moisture, ice, snow, or other cause, and may be handled on grades equally well under all conditions.

To meet special requirements, my invention also contemplates the use of more than one traction-wheel. In case more than one is used they may either be mounted tandem, one in front of the other, or side by side. Such a modification will obviously constitute a mere duplication and will be no departure from my invention.

I claim—

1. In a vehicle-propelling mechanism, the combination with a suitable motor or motors, carried on said vehicle, of a traction-wheel, consisting of a rigid hub or body in which are secured a plurality of resilient teeth capable of endwise compression, said traction-wheel being so supported that the free ends of said teeth will engage the road-bed and driving connection between said motor or motors and said traction-wheel, substantially as described.

2. In a vehicle-propelling mechanism, the combination with a motor or motors, carried on said vehicle, of a traction-wheel, consisting of a rigid hub or body in which are secured spiral rows of resilient teeth capable of endwise compression, said traction-wheel being so supported that the free ends of said teeth will engage the road-bed and driving connection between said motor or motors and said traction-wheel, substantially as described.

3. In a vehicle-propelling mechanism, the combination with a motor or motors, carried on the vehicle, of a traction-wheel, consisting of a rigid hub or body in which are secured a plurality of resilient teeth, formed of strands of cable tempered a mild spring-temper, said traction-wheel being so supported that the free ends of said teeth will be in engagement with the road-bed and driving connection between said motor or motors and said traction-wheel, substantially as described.

4. In a vehicle-propelling mechanism, the combination of a traction-wheel, consisting of a rigid hub or body in which are secured a plurality of resilient teeth capable of endwise compression, said traction-wheel being supported upon the car in such position that the free ends of the teeth will be in contact with the road-bed, and means to impart rotary movement to said traction-wheel, substantially as described.

5. In a vehicle-propelling mechanism, the combination of a traction-wheel, consisting of a rigid hub or body and a plurality of resilient teeth capable of endwise compression secured in spiral rows therein, said traction-wheel being so supported that the free ends of the teeth will be in contact with the road-bed, and means to impart rotary movement to said traction-wheel, substantially as described.

6. In a vehicle-propelling mechanism, the combination of a traction-wheel, consisting of a rigid hub or body in which are secured a plurality of resilient teeth, corrugations or projections formed in the road-bed, said traction-wheel being so supported that the free ends of the teeth will engage said corrugations or projections, and means to impart rotary movement to said traction-wheel, substantially as described.

7. In a vehicle-propelling mechanism, the combination of a traction-wheel, consisting of a rigid hub or body in which are secured spiral rows of resilient teeth capable of endwise compression, a bar or rail secured to the road-bed in which are formed corrugations or projections, said traction-wheel being so supported that the free ends of said teeth will engage the corrugations or projections in said bar or rail, and means to impart rotary movement to said traction-wheel, substantially as described.

8. In a vehicle-propelling mechanism, the combination with a suitable motor or motors, carried on the vehicle, of a traction-wheel, consisting of a rigid hub or body in which are secured a plurality of resilient teeth capable of endwise compression, corrugations or projections formed in the road-bed, said traction-wheel being so supported that the free ends of said teeth will engage said corrugations or projections, and driving connection between said motor or motors and said traction-wheel, substantially as described.

9. In a vehicle-propelling mechanism, the combination of a traction-wheel, consisting of a rigid hub or body in which are secured a plurality of resilient teeth capable of endwise compression, said traction-wheel being so supported that the free ends of the teeth will engage the road-bed and being yieldingly supported so as to be bodily movable toward and from the road-bed, and means to impart rotary movement to said traction-wheel, substantially as described.

10. In a vehicle-propelling mechanism, the combination with a motor or motors carried on the vehicle, of a traction-wheel, consisting of a rigid hub or body in which are secured spiral rows of resilient teeth capable of endwise compression, a bar or rail secured to the road-bed, in which are formed corrugations or projections, said traction-wheel being supported in such position that the free ends of said teeth will engage said corrugations or projections and being yieldingly supported so as to be bodily movable toward and from the road-bed, and driving connection between said motor or motors and said traction-wheel, substantially as described.

11. In a vehicle-propelling mechanism, the combination of a traction-wheel, consisting of a rigid hub or body in which are secured a plurality of resilient teeth capable of endwise compression, said traction-wheel being supported in such position that the free ends of said teeth will engage the road-bed, means to impart rotary movement to said traction-wheel and a brake applied thereto, substantially as described.

12. In a vehicle-propelling mechanism, the combination of a traction-wheel, consisting of a rigid hub or body in which are secured a plurality of resilient teeth capable of endwise compression, said traction-wheel being supported in such position that the free ends of said teeth will engage the road-bed, means to impart rotary movement to said traction-wheel, a brake-disk rigidly connected thereto, a cable adjusted to a peripheral groove formed in said brake-disk, one end of which is anchored and the other end connected to a brake-lever, substantially as described.

13. In a vehicle-propelling mechanism, the combination with a traction-wheel, consisting of a rigid hub or body in which are secured a plurality of resilient teeth capable of endwise compression, a bar or rail secured to the road-bed in which are formed corrugations or projections, said traction-wheel being so supported that the free ends of said teeth will engage said corrugations or projections, means to impart rotary movement to said traction-wheel, a disk rigidly connected to said traction-wheel, a V-shaped groove formed in the periphery of said disk, a wire rope or cable adjusted to said groove, said wire rope or cable being anchored at one end and connected at its opposite end to a brake-lever, substantially as described.

14. In a vehicle-propelling mechanism, the combination with a traction-wheel, consisting of a rigid hub or body in which are secured rows of resilient teeth, a bar or rail secured to the road-bed in which are formed corrugations or projections, the pitch of said corrugations being one-half that of the rows of traction-teeth, said traction-wheel being supported in such position that the free ends of said teeth will engage said corrugations or projections in the road-bed and means to impart rotary movement to said traction-wheel, substantially as described.

15. In a vehicle-propelling mechanism, the combination of a motor or motors carried on the vehicle and having elastic connection with the rigidly-supported parts of the said vehicle, a traction-wheel, consisting of a rigid hub or body in which are secured a plurality of brush-teeth capable of endwise compression, said traction-wheel being so located that the free ends of the teeth will be in engagement with the road-bed and driving connection between said motor or motors and said traction-wheel, substantially as described.

16. In a vehicle-propelling mechanism, the combination with a suitable motor or motors carried on said vehicle, of a traction-wheel, consisting of a rigid hub or body in which are secured a plurality of resilient teeth capable of endwise compression, said traction-wheel being bodily movable toward and from the road-bed and being supported in such position that, when depressed, the free ends of the teeth will be in contact with the road-bed, means to raise and lower said wheel so as to effect engagement or disengagement of the traction-wheel with the road-bed and driving connection between said motor or motors and said traction-wheel, substantially as described.

17. In a vehicle-propelling mechanism, the combination with a suitable motor or motors, carried on said vehicle, of a traction-wheel, consisting of a rigid hub or body in which are secured a plurality of resilient teeth, rigidly secured to a suitable shaft the ends of which are supported in blocks, movable toward and from the road-bed in suitable guide slots or ways, a rigid beam connecting said block, a second rigid beam supported in fixed position above said beam, connecting the said movable blocks, a screw-shaft threaded through said fixed beam and secured against longitudinal movement in said lower beam, means to manipulate said screw-shaft and driving connection between said motor or motors and said traction-wheel, substantially as described.

18. In a vehicle-propelling mechanism, the combination with a suitable motor or motors, carried on said vehicle, of a traction-wheel, consisting of a rigid hub or body in which are secured a plurality of resilient teeth, rigidly secured to a suitable shaft, the ends of which are supported in journal-blocks, $a^4$, fitted to and movable toward and from the road-bed in guide slots or ways, $a^5$, formed in other blocks, $A^2$, which are, in turn, movable toward and from the road-bed in suitable guide slots or ways formed in standards secured to or formed integral with the side bars of the truck-frame, springs inserted between the journal-blocks $a^4$, and the ends of the slots in the blocks, $A^2$, a rigid beam, $A^5$, connecting said blocks, $A^2$, a second rigid beam, $A^6$, supported in fixed position above said beam, $A^5$, a screw-shaft threaded through the beam, $A^6$, and secured against longitudinal movement in the beam, $A^5$, means to manipulate said screw-shaft and driving connection between said motor or motors and said traction-wheel, substantially as described.

In testimony that I claim the foregoing as my invention I hereunto set my hand this 8th day of February, 1896.

CHARLES B. FAIRCHILD.

Witnesses:
F. C. CRITTENDEN,
GRACE FERN.